(12) United States Patent
Miyajima

(10) Patent No.: US 10,670,984 B2
(45) Date of Patent: Jun. 2, 2020

(54) LIGHT GUIDING MEMBER, DETECTOR, SPECTRAL COLORIMETRIC APPARATUS, AND IMAGE FORMING APPARATUS

(71) Applicant: CANON KABUSHIKI KAISHA, Tokyo (JP)

(72) Inventor: Yu Miyajima, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 23 days.

(21) Appl. No.: 16/202,456

(22) Filed: Nov. 28, 2018

(65) Prior Publication Data

US 2019/0163083 A1      May 30, 2019

(30) Foreign Application Priority Data

Nov. 28, 2017  (JP) ................... 2017-227617

(51) Int. Cl.
| | |
|---|---|
| *G01J 3/02* | (2006.01) |
| *G03G 15/01* | (2006.01) |
| *G01J 3/42* | (2006.01) |
| *G01J 3/20* | (2006.01) |
| *G02B 5/10* | (2006.01) |

(52) U.S. Cl.
CPC .......... *G03G 15/011* (2013.01); *G01J 3/0218* (2013.01); *G01J 3/0256* (2013.01); *G01J 3/20* (2013.01); *G01J 3/42* (2013.01); *G02B 5/10* (2013.01)

(58) Field of Classification Search
CPC ......... G03G 15/011; G03G 2215/00611; G01J 3/20; G01J 3/0218; G01J 3/42; G01J 3/0256; G02B 5/10; G02B 6/0013; G02B 6/0018
See application file for complete search history.

(56) References Cited

U.S. PATENT DOCUMENTS

| | | |
|---|---|---|
| 10,012,938 B2 | 7/2018 | Miyajima |
| 10,054,790 B2 | 8/2018 | Sumida et al. |
| 2012/0133944 A1* | 5/2012 | Iwasaki ............... G01J 3/0205 356/445 |
| 2016/0202393 A1 | 7/2016 | Saiga et al. |
| 2018/0329348 A1 | 11/2018 | Miyajima |

FOREIGN PATENT DOCUMENTS

| | | |
|---|---|---|
| JP | 2007183444 A | 7/2007 |
| JP | 2007279137 A | 10/2007 |
| JP | 2015087742 A | 5/2015 |

* cited by examiner

*Primary Examiner* — Abdullahi Nur
(74) *Attorney, Agent, or Firm* — Carter, DeLuca & Farrell LLP

(57) ABSTRACT

For the purpose of providing a light guiding member with a simple structure which is capable of suppressing risk that unnecessary light could be mixed in a primary optical path, a light guiding member according to the present invention includes an incident surface, a reflection surface which reflects a light flux from the incident surface, and a side surface disposed at a distance of 1.2 R or more from a center of the reflection surface, where R is a distance from the center to an edge portion of the reflection surface, in a direction perpendicular to a first cross-section including an incident light toward the reflection surface on an optical axis and a reflected light from the reflection surface on the optical axis.

20 Claims, 6 Drawing Sheets

LIGHT GUIDING MEMBER, DETECTOR, SPECTRAL COLORIMETRIC APPARATUS, AND IMAGE FORMING APPARATUS

BACKGROUND OF THE INVENTION

Field of the Invention

The present invention relates to a light guiding member, a detector, and a spectral colorimetric apparatus used in an image forming apparatus such as a laser beam printer (LBP), a digital copier, or a multifunction printer.

Description of the Related Art

Light receiving optical systems in recent years for guiding light to light receiving elements employ a light guiding member in which an optical path from the incident surface to the exit surface is provided with a reflection surface for the purpose of size reduction achieved by folding the optical path and reduction in the number of parts such as reflection members.

It is known that the optical performance of such a light guiding member having a reflection surface decreases when unnecessary light reflected on the side surfaces is mixed in the optical path along which the light being incident on the incident surface travels directly toward the reflection surface (hereinafter referred to as a primary optical path).

In order to suppress the risk that such unnecessary light could be mixed in, Japanese Patent Application Laid-Open No. 2015-87742 discloses a light guiding member which suppresses the occurrence itself of unnecessary light by providing prism-shaped grooves in the side surfaces.

However, the light guiding member disclosed in Japanese Patent Application Laid-Open No. 2015-87742 is difficult to manufacture because it has prism-shaped grooves provided in the side surfaces thereof.

SUMMARY OF THE INVENTION

In view of the above circumstances, the present invention aims to provide a light guiding member with a simple structure which is capable of suppressing the risk that unnecessary light could be mixed in the primary optical path.

A light guiding member according to the present invention is a light guiding member including an incident surface, a reflection surface which reflects a light flux from the incident surface, and a side surface, in which the side surface is disposed at a distance of 1.2 R or more from a center of the reflection surface, where R is a distance from the center to an edge portion of the reflection surface, in a direction perpendicular to a first cross-section including an incident light toward the reflection surface on an optical axis and a reflected light from the reflection surface on the optical axis.

Further features of the present invention will become apparent from the following description of exemplary embodiments with reference to the attached drawings.

DESCRIPTION OF THE EMBODIMENTS

First Embodiment

Hereinafter, a description is provided for the light guiding members according to the present embodiments based on the drawings. Note that the drawings to be shown later may be drawn in scales different from the actual ones in order to facilitate the understanding of the present embodiments.

Figure 1:
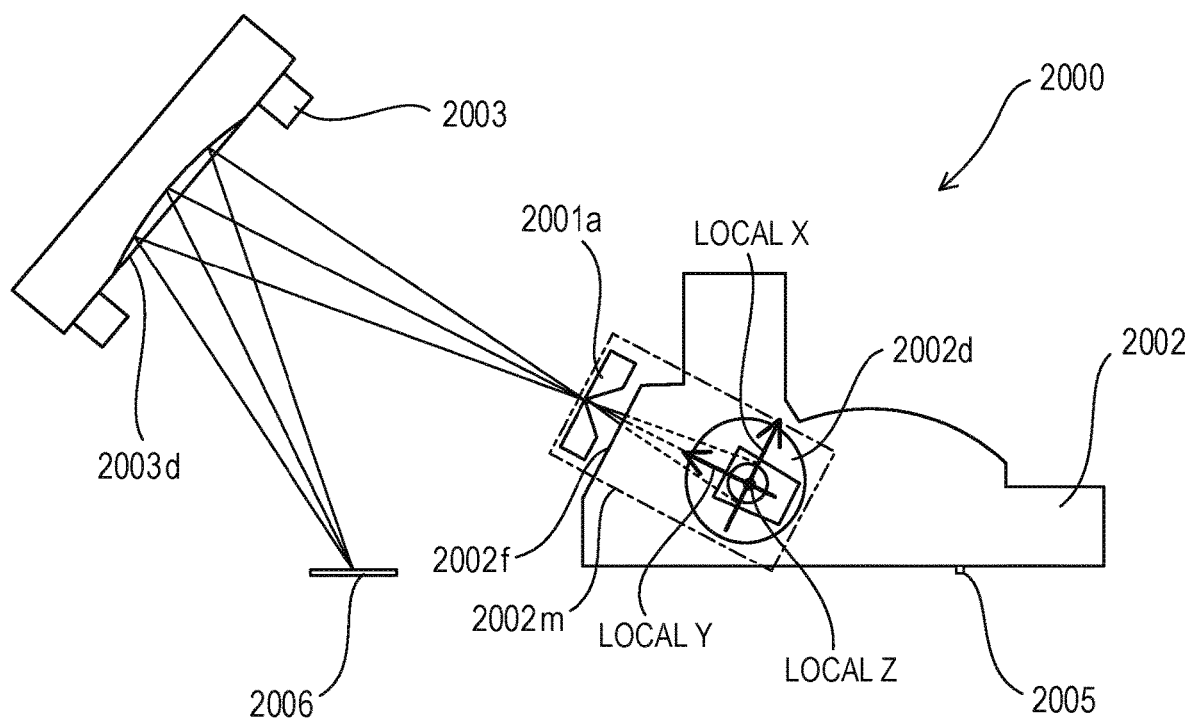
FIG. 1 is a plan view of a main part of a spectral colorimetric apparatus including a light guiding member according to a first embodiment.

FIG. 1 illustrates a plan view of a main part of a spectral colorimetric apparatus 2000 including a light guiding member 2002 according to the first embodiment.

Figure 2:
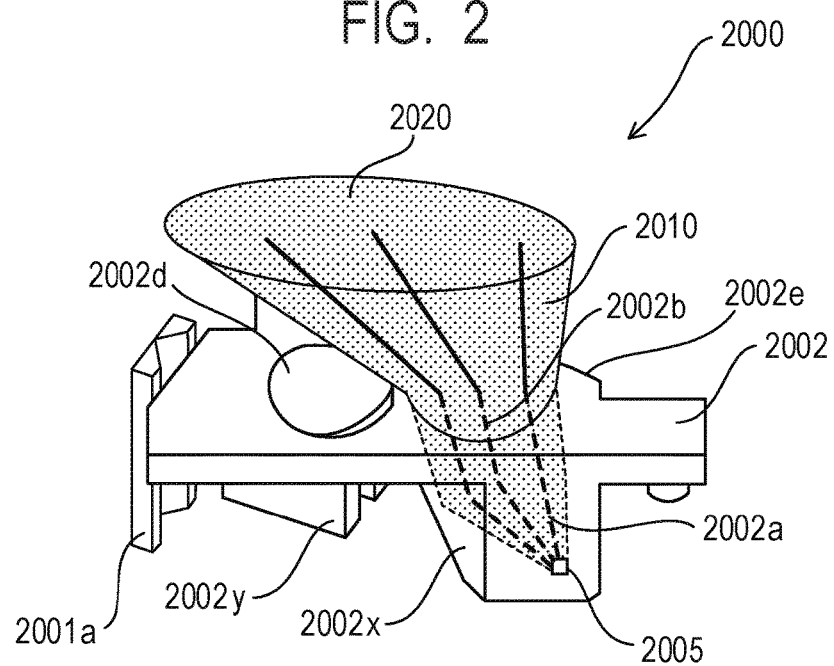
FIG. 2 is a perspective view of a main part of the spectral colorimetric apparatus including the light guiding member according to the first embodiment.
Figure 2:
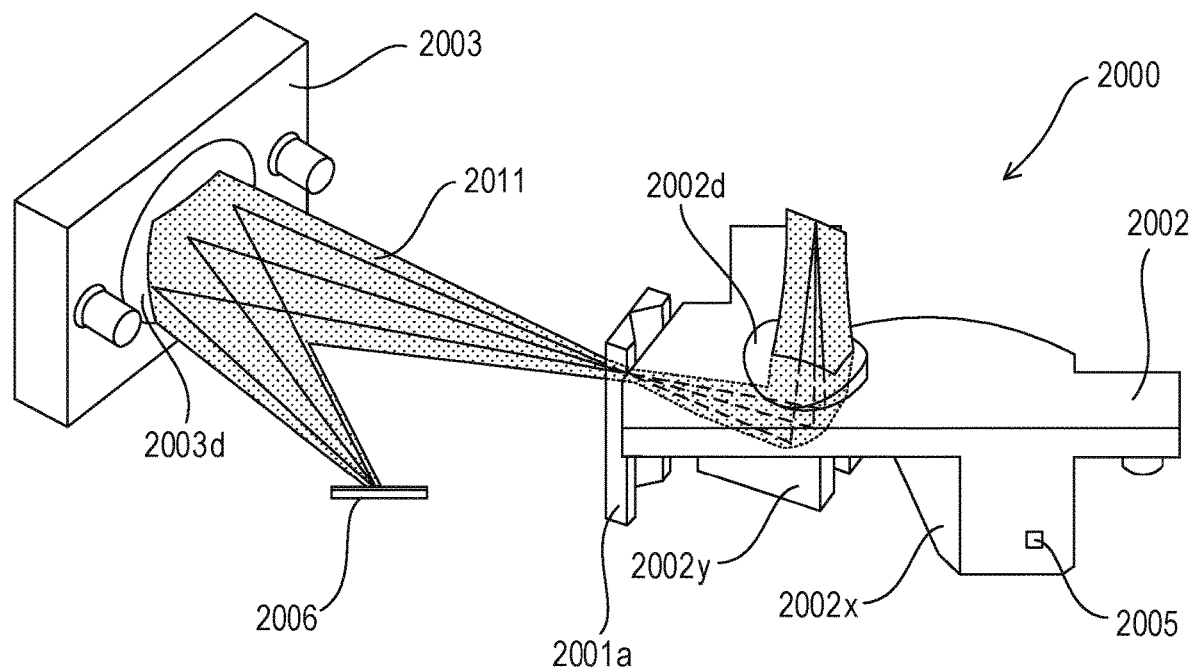

Additionally, FIG. 2 illustrates a perspective view of a main part of the spectral colorimetric apparatus 2000 including the light guiding member 2002 according to the present embodiment. Note that FIG. 2 also illustrates optical paths in an illuminating optical system 2010 and a light receiving optical system 2011.

The spectral colorimetric apparatus 2000 includes a slit 2001a, a light guiding member 2002, a diffraction element (spectroscopic element) 2003, a light source 2005, and a light receiving element 2006.

The light guiding member 2002 and the diffraction element 2003 are held on a non-illustrated resin housing of the spectral colorimetric apparatus 2000.

In addition, the light source 2005 and the light receiving element 2006 are mounted on a non-illustrated electronic board of the spectral colorimetric apparatus 2000, and the electronic board is fixed with screws to the housing of the spectral colorimetric apparatus 2000.

The housing of the spectral colorimetric apparatus 2000 has a slit (light blocking element) 2001a integrally formed therein.

The housing of the spectral colorimetric apparatus 2000 has a non-illustrated cover assembled thereto. Part of the cover has an open window for securing optical paths of irradiation light irradiated from the light guiding member 2002 onto a non-illustrated detected object disposed on the irradiated surface 2020 and of scattered light scattered from the detected object to the light guiding member 2002. Moreover, in order to prevent dust, paper dust, and the like from entering the housing, a cover sheet made of PET is attached to the open window at the inside of the housing.

The light source 2005 is a white LED having a light emitting portion of 0.2 mm×0.2 mm generally called the TOPVIEW type and emits a light flux radially from its light emitting surface. The light amount of the light beam emitted from the light source 2005 has a luminous intensity distribution characteristic which is at maximum in the surface normal direction of the light emitting surface and gradually decreases as the inclination from the surface normal increases.

The light guiding member 2002 is an optical element made of an acrylic resin.

The light guiding member 2002 is formed by integrating a light guiding member portion 2002$x$ and a light guiding member portion 2002$y$ together.

The light guiding member portion 2002$x$ is a light guiding member portion which is the illuminating optical system 2010 including an illumination light incident surface 2002$a$, an elliptic reflection surface 2002$e$, and an illumination light exit surface 2002$b$.

The light guiding member portion 2002$y$ is a light guiding member portion for the light receiving optical system (spectroscopic optical system) 2011 including an anamorphic surface (incident surface) 2002$d$, a folding reflection surface 2002$r$, and a received light exit surface 2002$f$.

The diffraction element 2003 has a concave reflection-type diffraction surface 2003$d$ with a diffraction grating and is manufactured by depositing a reflection film of aluminum or the like and an increased reflection film of SiO$_2$ or the like on a resin substrate prepared by injection molding.

The light receiving element 2006 is an optical element formed by arranging photoelectric conversion elements such as a plurality of Si photodiodes in the form of an array in the spectral direction.

Next, a description is provided for a colorimetric method using the spectral colorimetric apparatus 2000.

In the spectral colorimetric apparatus 2000, the light guiding member portion 2002$x$ forms the illuminating optical system 2010, and the light guiding member portion 2002$y$, the slit 2001$a$, and the diffraction element 2003 form the light receiving optical system (spectroscopic optical system) 2011.

The colorimetry of the detected object is carried out by the illuminating optical system 2010 which illuminates the non-illustrated detected object disposed on the irradiated surface 2020 and by the spectroscopic optical system 2011 which disperses the scattered light from the detected object.

A light beam emitting from the light source 2005 enters inside of the light guiding member 2002 from the illumination light incident surface 2002$a$ of the light guiding member 2002 in contact with the light source 2005, and then is reflected upwards by the elliptic reflection surface 2002$e$. The reflected light beam exits to the outside of the light guiding member 2002 from the illumination light exit surface 2002$b$ and is irradiated onto the detected object disposed on the irradiated surface 2020. Then, the light beam being incident on the detected object is scattered. Part of the scattered light enter again inside of the light guiding member 2002 from the anamorphic surface 2002$d$ having a light-collecting function in a second cross-section parallel to the first direction (direction perpendicular to a first cross-section which is parallel to a first optical path of the incident light entering the folding reflection surface 2002$r$ on the optical axis and to a second optical path of the reflected light reflected by the folding reflection surface 2002$r$) and the first optical path. Then, the incident light beam is folded by the folding reflection surface 2002$r$ into a third cross-section parallel to the first direction and the second optical path, exits again to the outside of the light guiding member 2002 from the received light exit surface 2002$f$, and is collected on the slit 2001$a$ substantially in the line form.

Then, the light beam having passed the slit 2001$a$ is dispersed by the diffraction element 2003 and then forms a slit image on the light receiving element 2006 for each wavelength.

This is a Rowland type spectroscope configuration that is simple in structure and effective for downsizing.

Note that in the spectral colorimetric apparatus 2000 including the light guiding member 2002 according to the present embodiment, the optical axis is defined as an axis which passes through the center of the slit hole of the slit 2001$a$ and which is perpendicular to the plane of the slit hole. In addition, the dispersing direction is perpendicular to the first cross-section described above.

Dispersed slit images are formed on the photoelectric conversion elements of the light receiving element 2006 arranged in the form of an array. The processing unit carries out processing by correcting a signal detected by each of the photoelectric conversion elements using, for example, the spectroscopic characteristics of the light source 2005 and the spectroscopic light sensitivity characteristic of the light receiving element 2006. In this way, the color tone of the detected object is calculated.

Note that in the present embodiment, the detected area, that is, the area of the detected object for calculating color tone is 0.2 mm×0.2 mm.

In the case where the light source 2005 is close to the light guiding member 2002 as in the present embodiment, the necessary size of the elliptic reflection surface 2002$e$ is set in consideration of the spread angle and the total reflection conditions for the light flux immediately after the emission to the light guiding member 2002. This makes it possible to achieve the downsizing of the light guiding member 2002 while securing sufficient illumination efficiency.

Next, a description is provided for the optical performance of the spectral colorimetric apparatus 2000.

It is the folding reflection surface 2002$r$ of the light guiding member 2002 that mainly contributes to the optical performance of the spectral colorimetric apparatus 2000 in the light guiding member 2002. Specifically, the folding reflection surface 2002$r$ is the reflection surface largely contributing to the optical performance of the light guiding member 2002 (hereinafter referred to as the main reflection surface).

Here, the main reflection surface is a reflection surface which mainly contributes to a desired imaging performance as an optical system or to a desired light-guiding performance as a light guiding member.

In addition, in order to enhance the light-guiding performance of the light guiding member, it is important to improve the shape of the side surfaces around the main reflection surface as shown below.

Figure 3A:
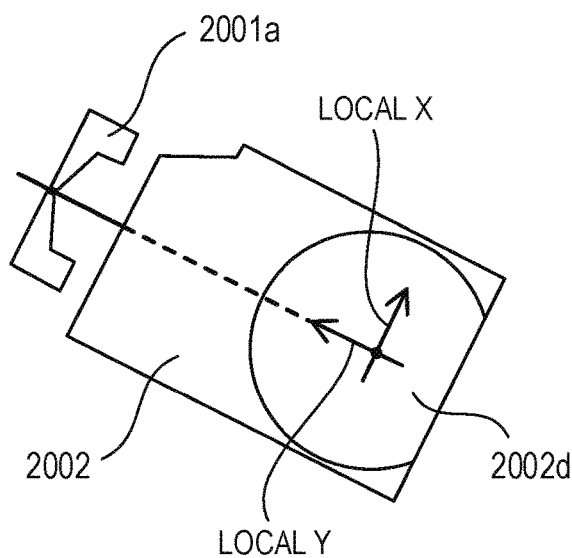
FIG. 3A is a cross-sectional view of a main part of the spectral colorimetric apparatus including the light guiding member according to the first embodiment.
Figure 3B:
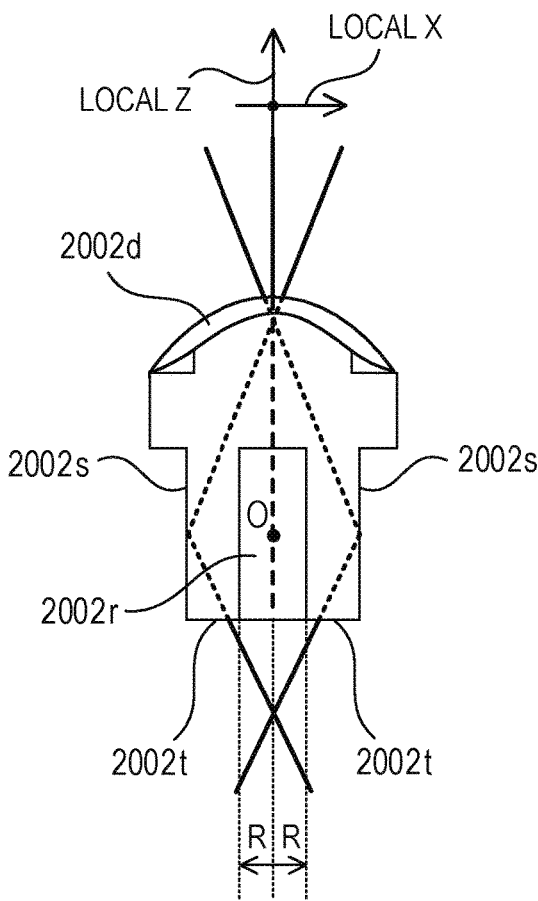
FIG. 3B is a cross-sectional view of a main part of the spectral colorimetric apparatus including the light guiding member according to the first embodiment.
Figure 3C:
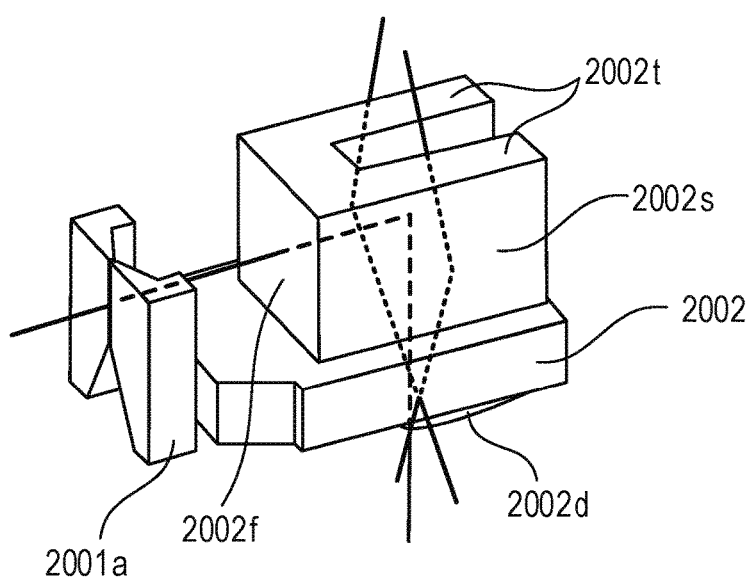
FIG. 3C is a perspective view of a main part of the spectral colorimetric apparatus including the light guiding member according to the first embodiment.

FIGS. 3A, 3B, and 3C each illustrate a local XY cross-sectional view, a local XZ cross-sectional view viewed in the +local Y direction, and a perspective view of a main part 2002$m$ of the spectral colorimetric apparatus 2000 surrounded by the dot-dash lines of FIG. 1.

Note here that FIG. 3B does not illustrate the slit 2001a and that FIG. 3C and FIG. 3B have an inverted relationship.

Note that the local X direction, the local Y direction, and the local Z direction are parallel to the first direction (direction perpendicular to the first cross-section which is parallel to the optical path of the incident light entering the folding reflection surface 2002r on the optical axis and to the optical path of the reflected light reflected by the folding reflection surface 2002r), the direction parallel to the second optical path, and the direction parallel to the first optical path, respectively.

Thus, the first optical path, the second optical path, and the first direction described above are parallel to the local Z direction, the local Y direction, and the local X direction, respectively. In addition, the first cross-section, the second cross-section, and the third cross-section are parallel to the local YZ cross-section, the local XZ cross-section, and the local XY cross-section, respectively.

Moreover, the center of the detected object is positioned at the origin of the local XYZ coordinate system.

The slit 2001a is disposed such that the transverse direction and the longitudinal direction of the slit hole of the slit 2001a are parallel to the first direction and the first optical path, respectively.

Table 1 below show the optical design values of the spectral colorimetric apparatus 2000.

$$z = \frac{\frac{(x^2 + y^2)}{R}}{1 + \sqrt{1 - (1+k)\frac{x^2 + y^2}{R^2}}} + \sum_{m,n} C_{m,n} x^2 y^2 \quad (1)$$

Here, R, k, and $C_{m,n}$ are aspheric coefficients. In addition, x, y, and z in the expression (1) are each a plane coordinate defined as having the origin at the surface apex of the anamorphic surface 2002d. In the present embodiment, the x direction, the y direction, and the z direction in the expression (1) are parallel to the local X, the local Y, and the local Z directions, respectively.

Moreover, Tilt X is an operation of rotating from the local Y direction to the local Z direction in the right-handed system with the local X axis as the center of rotation, and Tilt Y is an operation of rotating from the local Z direction to the local X direction in the right-handed system with the local Y axis as the center of rotation.

Furthermore, Tilt Z is an operation of rotating from the local X direction to the local Y direction in the right-handed system with the local Z axis as the center of rotation.

Note that in the case of (Tilt X, Tilt Y, Tilt Z)=(0, 0, 0), assume that the surface normal is oriented in the local Z direction and the above operations are carried out in the order of Tilt X, Tilt Y, and Tilt Z.

The light guiding member 2002 according to the present embodiment has convex portions on both sides of the first

TABLE 1

|  |  | Symbol | Value |
| --- | --- | --- | --- |
| Main Wavelength of Light Source 2005 |  | λ | 550 nm |
| Refractive Index of Light guiding member 2002 |  | n(λ) | 1.49361 |
| Anamorphic Surface 2002d | Aspheric Coefficients | R | −4.25 |
|  |  | K | −0.67186 |
|  |  | C02 | −0.23746 |
|  |  | C22 | 0.009414 |
|  |  | C04 | 0.017413 |
|  | Opening | φ | 4.5 |
| Slit 2001a | Width | hs | 0.06 |
|  | Length | ls | 1.8 |
| Folding Reflection Surface 2002r | Width | hr | 1.2 |
|  | Length | lr | 4.8 |
| Unnecessary Light Transmitting Surface 2002t | Width (−X Side) | ht− | 1.0 |
|  | Width (+X side) | ht+ | 1.0 |

|  | Local Coordinate | | | Tilt (Direction of Surface Normal) | | |
| --- | --- | --- | --- | --- | --- | --- |
|  | X | Y | Z | Tilt X | Tilt Y | Tilt Z |
| Center Position of Detection | 0 | 0 | 0 | 0 | 0 | 90 |
| Anamorphic Surface 2002d | 0 | 0 | −4.3 | 0 | 0 | −90 |
| Folding Reflection Surface 2002r | 0 | 0 | −8.6 | −135 | 0 | 90 |
| Received Light Exit Surface 2002f | 0 | 3.2 | −8.6 | −90 | 0 | −90 |
| Slit 2001a | 0 | 6.7 | −8.6 | −90 | 0 | −90 |
| Unnecessary Light Transmitting Surface 2002t (−X Side) | −1.1 | 0 | −10.4 | 0 | 0 | 90 |
| Unnecessary Light Transmitting Surface 2002t (+X Side) | 1.1 | 0 | −10.4 | 0 | 0 | 90 |

Note that as shown in Table 1, the coordinates of the slit 2001a and the optical planes of the light guiding member 2002 are defined by the local XYZ coordinate system.

In addition, the aspherical shape of the anamorphic surface 2002d is represented by the following expression (1).

cross-section of the folding reflection surface 2002r. In addition, the anamorphic surface 2002d, the folding reflection surface 2002r, and the side surfaces 2002s are integrally formed. Moreover, the folding reflection surface 2002r and the side surfaces 2002s are perpendicular to each other. Furthermore, the normal on the optical axis of the anamorphic surface 2002d and the side surfaces 2002s are parallel to each other. Note that perpendicular and parallel mentioned here include not only the case of strict perpendicularity and parallelism but also substantial perpendicularity and substantial parallelism with an error of a few degrees due to manufacturing errors and the like.

Next, a description is provided for a conventional spectral colorimetric apparatus 4000 as a comparative example for the present embodiment.

The spectral colorimetric apparatus 4000 of the comparative example has the same configuration as that of the spectral colorimetric apparatus 2000 according to the present embodiment except for having a light guiding member 4002 instead of the light guiding member 2002. For this reason, the same members are labeled with the same reference numerals for omission of explanation.

In addition, as described later, the light guiding member 4002 has the same configuration as that of the light guiding member 2002 except that an unnecessary light transmitting surface 2002t is not provided. For this reason, each of the same optical planes has "4" in its thousand's place instead of "2."

Figure 4A:
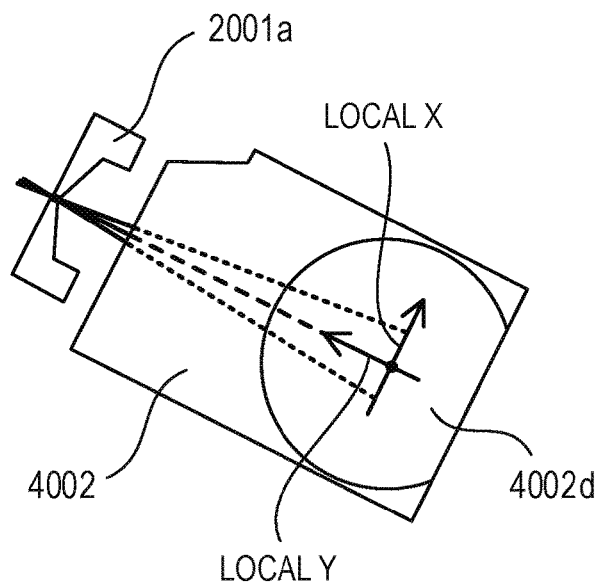
FIG. 4A is a cross-sectional view of a main part of the spectral colorimetric apparatus including a light guiding member of a comparative example.
Figure 4B:
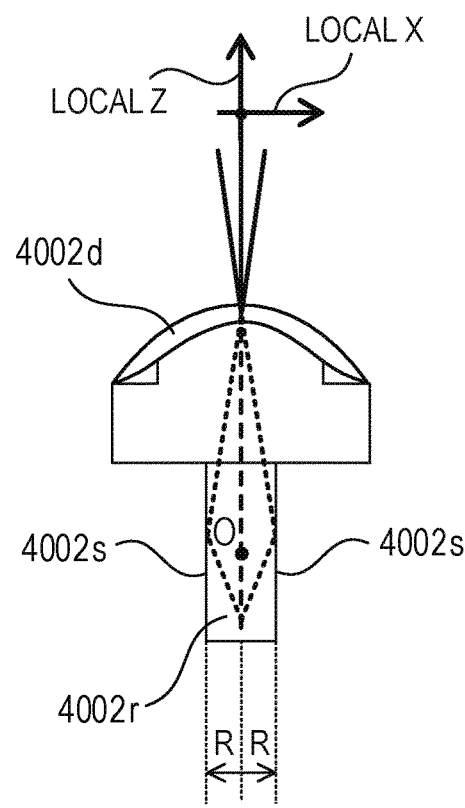
FIG. 4B is a cross-sectional view of a main part of the spectral colorimetric apparatus including the light guiding member of the comparative example.
Figure 4C:
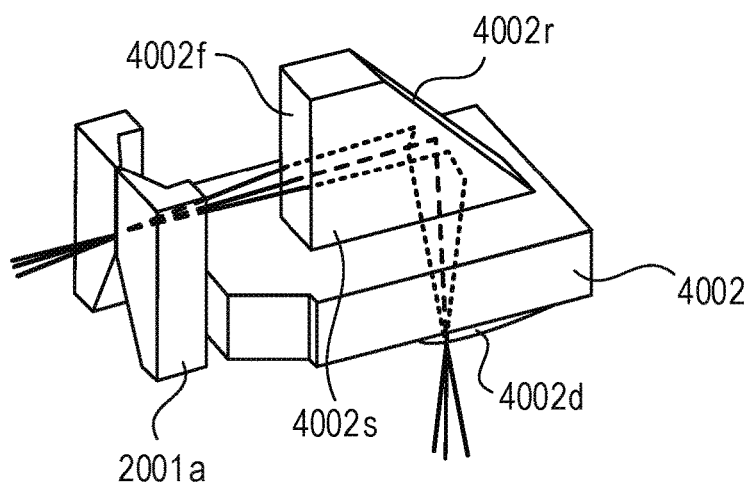
FIG. 4C is a perspective view of a main part of the spectral colorimetric apparatus including the light guiding member of the comparative example.

FIGS. 4A, 4B, and 4C each illustrate a local XY cross-sectional view, a local XZ cross-sectional view viewed in the +local Y direction, and a perspective view of a main part 4002m of the spectral colorimetric apparatus 4000.

Note here that FIG. 4B does not illustrate the slit 2001a and that FIG. 4C and FIG. 4B have an inverted relationship.

Note that the local X direction, the local Y direction, and the local Z direction are parallel to the first direction (direction perpendicular to the first cross-section which is parallel to the first optical path of the incident light entering the folding reflection surface 4002r on the optical axis and to the second optical path of the reflected light reflected by the folding reflection surface 4002r), the direction parallel to the second optical path, and the direction parallel to the first optical path, respectively. Moreover, the center of the detected object is positioned at the origin of the local XYZ coordinate system.

Furthermore, the slit 2001a is disposed such that the transverse direction and the longitudinal direction of the slit hole of the slit 2001a are parallel to the first direction and the first optical path, respectively.

Table 2 below show the optical design values of the spectral colorimetric apparatus 4000.

TABLE 2

|  |  | Symbol | Value |
|---|---|---|---|
| Main Wavelength of Light Source 2005 |  | $\lambda$ | 550 nm |
| Refractive Index of Light guiding member 4002 |  | $n(\lambda)$ | 1.49361 |
| Anamorphic Surface 4002d | Aspheric | R | −4.25 |
|  | Coefficients | K | −0.67186 |
|  |  | C02 | −0.23746 |
|  |  | C22 | 0.009414 |
|  |  | C04 | 0.017413 |
|  | Opening | $\varphi$ | 4.5 |
| Slit 2001a | Width | hs | 0.06 |
|  | Length | ls | 1.8 |
| Folding Reflection Surface | Width | hr | 1.2 |
| 4002r | Length | lr | 4.8 |

| | Local Coordinate | | | Tilt (Direction of Surface Normal) | | |
|---|---|---|---|---|---|---|
| | X | Y | Z | Tilt X | Tilt Y | Tilt Z |
| Center Position of Detection | 0 | 0 | 0 | 0 | 0 | 90 |
| Anamorphic Surface 4002d | 0 | 0 | −4.3 | 0 | 0 | −90 |
| Folding Reflection Surface 4002r | 0 | 0 | −8.6 | −135 | 0 | 90 |
| Received Light Exit Surface 4002f | 0 | 3.2 | −8.6 | −90 | 0 | −90 |
| Slit 2001a | 0 | 6.7 | −8.6 | −90 | 0 | −90 |

Note that the coordinates of the slit 2001a and the optical planes of the light guiding member 4002 are defined by the local XYZ coordinate system, and the aspherical shape of the anamorphic surface 4002d is represented by the expression (1).

Moreover, Tilt X is an operation of rotating from the local Y direction to the local Z direction in the right-handed system with the local X axis as the center of rotation, and Tilt Y is an operation of rotating from the local Z direction to the local X direction in the right-handed system with the local Y axis as the center of rotation.

Furthermore, Tilt Z is an operation of rotating from the local X direction to the local Y direction in the right-handed system with the local Z axis as the center of rotation.

Note that in the case of (Tilt X, Tilt Y, Tilt Z)=(0, 0, 0), assume that the surface normal is oriented in the local Z direction and the above operations are carried out in the order of Tilt X, Tilt Y, and Tilt Z.

In the spectral colorimetric apparatus 4000 of the comparative example, part of the light beam scattered by the detected object enters inside of the light guiding member 4002 from the anamorphic surface 4002d and then are divided into a primary optical path (dashed line) directly toward the folding reflection surface 4002r and secondary optical paths (dotted lines) which are reflected by the side surface 4002s toward the folding reflection surface 4002r, as illustrated in FIGS. 4A to 4C.

The light beam travelling along the primary optical path is folded by the folding reflection surface 4002r, passes through the slit 2001a, then is dispersed by the diffraction surface 2003d of the diffraction element 2003, and condensed as desired light on the light receiving element 2006.

On the other hand, many of the light beams travelling along the secondary optical paths are folded by the folding reflection surface 4002r and then blocked by the slit 2001a. However, some of them pass through the slit 2001a. Some of those light beams of the secondary optical paths having passed through the slit 2001a are dispersed by the diffraction surface 2003*d* of the diffraction element 2003 and condensed on the light receiving element 2006, while others do not travel toward the diffraction surface 2003*d* but instead are scattered by the non-illustrated housing or a portion of the diffraction element 2003 other than the diffraction surface 2003*d* and then reach the light receiving element 2006.

The latter light beams of the secondary optical paths deteriorates the optical performance of the spectral colorimetric apparatus 4000. In addition, the former light beams, dispersed and condensed on the light receiving element 2006, have color information different from that of the light beams of the primary optical path because they have been reflected by the side surfaces 4002*s*. Thus, they too cause deteriorating of the optical performance.

Therefore, the spectrocolorimetric performance of the spectral colorimetric apparatus 4000 becomes insufficient if the light amount of the light beams of the secondary optical paths mixed in the primary optical path is too large to be ignored compared to the light amount of the desired light of the primary optical path.

The spectral colorimetric apparatus 2000 according to the present embodiment has been improved in order to suppress the risk that the unnecessary light of the secondary optical paths could be mixed in the primary optical path as described above.

In the spectral colorimetric apparatus 2000 according to the present embodiment, as illustrated in FIGS. 3A to 3C, the light beam travelling along the primary optical path (dashed line) is folded by the folding reflection surface 2002*r*, passes through the slit 2001*a*, then is dispersed by the diffraction surface 2003*d* of the diffraction element 2003, and condensed as desired light on the light receiving element 2006.

On the other hand, many of the light beams travelling along the secondary optical paths (dotted lines) are reflected at the side surfaces 2002*s*, travel toward the unnecessary light transmitting surface (unnecessary light exit surface) 2002*t* instead of travelling toward the folding reflection surface 2002*r*, transmit through the unnecessary light transmitting surface 2002*t*, and exit to the outside of the light guiding member 2002. Specifically, the unnecessary light beams along the secondary optical paths (dotted lines) travelling between the side surfaces 2002*s* and the folding reflection surface 2002*r* exit from the unnecessary light transmitting surface 2002*t*.

Thus, in the spectral colorimetric apparatus 2000 according to the present embodiment, the light beams of the secondary optical paths do not pass through the slit 2001*a* and hence is not condensed as unnecessary light on the light receiving element 2006. Therefore, the optical performance is not deteriorated.

This is because, in the light guiding member 2002 according to the present embodiment, the side surfaces 2002*s* are formed at a distance of 1.2 R or more along the first direction from the center O of the folding reflection surface 2002*r*, where R is the distance from the center O to either side in the first direction.

For more specific description, in the light guiding member 2002 according to the present embodiment, let R be the distance from the center O to the edge portion (distal end portion) of the folding reflection surface 2002*r* in the first direction and consider a fourth cross-section (second cross-section) which surrounds the center O, which includes the folding reflection surface 2002*r*, and which is parallel to the folding reflection surface 2002*r*. The side surfaces 2002*s* are formed in a fifth cross-section which includes at least part of an edge portion of a polygon, the edge portion being at a distance of 1.2 R or more from the center O in the fourth cross-section, and which is non-parallel to the fourth cross-section.

In other words, in the light guiding member 2002 according to the present embodiment, let R be the distance from the center to the edge portion of the folding reflection surface 2002*r* in the first direction perpendicular to the first cross-section which includes the incident light entering the folding reflection surface 2002*r* on the optical axis and the reflected light from the folding reflection surface 2002*r*, the light guiding member 2002 according to the present embodiment has the side surface 2002*s* positioned at a distance of 1.2 R or more from the center in the first direction.

To further put in different words, in the light guiding member 2002 according to the present embodiment, each of the side surfaces 2002*s* is not formed in a cross-section including at least part of an edge portion of the folding reflection surface 2002*r* and being not parallel to the folding reflection surface 2002*r*.

In the spectral colorimetric apparatus 4000 of the comparative example, each of the side surfaces 4002*s* is formed at a distance of 1.0 R along the first direction from the center O, that is, formed to include an edge portion of the folding reflection surface 4002*r*. For this reason, the light beams of the secondary optical paths are reflected by the side surfaces 4002*s* and then travel toward the folding reflection surface 4002*r*.

On the other hand, in the spectral colorimetric apparatus 2000 according to the present embodiment, each of the side surfaces 2002*s* is formed at a distance or 1.2 R or more along the first direction from the center O. Specifically, since the space is sufficiently widened between each side surface 2002*s* and an edge portion of the folding reflection surface 2002*r*, many of the light beams of the secondary optical paths do not travel toward the folding reflection surface 2002*r* after the reflection by the side surface 2002*s*.

To put in different words, in the light guiding member 2002 according to the present embodiment, there is no optical plane such as a reflection surface or a transmitting plane between each side surface 2002*s* and an edge portion of the folding reflection surface 2002*r* in the fourth cross-section which includes the folding reflection surface 2002*r* and which is parallel to the folding reflection surface 2002*r*.

In addition, in order to allow the incident light beams of the secondary optical paths to transmit and exit (so that a convex shape is formed toward the non-reflection optical path side of the folding reflection surface 2002*r*), unnecessary light transmitting surfaces 2002*t* are provided on the opposite side of the fourth cross-section which includes the folding reflection surface 2002*r* and which is parallel to the folding reflection surface 2002*r* from the light beam of the primary optical path reflected by the folding reflection surface 2002*r*. This makes it possible to divert the light beams of the secondary optical paths from the slit 2001*a* and away from the primary optical path.

Next, a description is provided for the effects of the present embodiment using the light amount.

Consider the light beams of the primary optical path directly toward the folding reflection surface 2002*r* (4002*r*) after entering again from the anamorphic surface 2002*d* (4002*d*) in the spectral colorimetric apparatus 2000 (4000), let I be the light amount of light beams passing through the slit 2001*a* in these light beams. In addition, consider the light beams of the secondary optical paths toward the folding reflection surface 2002*r* (4002*r*) after entering again from the anamorphic surface 2002*d* (4002*d*) and then being reflected by the side surface 2002s (4002s), let I' be the light amount of the light beams passing through the slit 2001a in these beams.

Here, the value of the ratio I'/I is defined as a secondary optical path light amount ratio of the light guiding member 2002 (4002) and as an evaluation index for the light guiding member 2002 (4002).

Note here that this secondary optical path light amount ratio does not directly represent the optical performance of the spectral colorimetric apparatus 2000 (4000) because not all of the light beams of the secondary optical paths having passed through the slit 2001a are condensed as unnecessary light on the light receiving element 2006.

It is possible to suppress the deteriorating of the optical performance of the spectral colorimetric apparatus 2000 (4000) by designing the configuration, for example by covering a light-blocking member over the housing of the spectral colorimetric apparatus 2000 (4000) or a portion of the diffraction element 2003 other than the diffraction surface 2003d.

Specifically, this secondary optical path light amount ratio indicates the extent of the influence of the unnecessary light generated in the light guiding member 2002 (4002) on the spectroscopic optical system 2011 (4011).

A simulation was carried out using the optical design values shown in Table 1 and Table 2 to obtain as a result the secondary optical path light amount ratio I'/I for the spectral colorimetric apparatus 2000 (4000) as below.

The secondary optical path light amount ratio I'/I for the spectral colorimetric apparatus 4000 of the comparative example=37%

The secondary optical path light amount ratio I'/I for the spectral colorimetric apparatus 2000 according to the present embodiment=0%

As described above, the spectral colorimetric apparatus 2000 including the light guiding member 2002 according to the present embodiment is capable of suppressing the risk that unnecessary light, a cause of deteriorating the optical performance, could be mixed in the primary optical path along which the desired light travels, while forming the light guiding member 2002 in a simple structure.

This makes it unnecessary to take measures against unnecessary light in the spectral colorimetric apparatus 2000, especially in the spectroscopic optical system 2011 and to enhance the degree of freedom of the configuration.

Note that although the above description deals with a polygon which surrounds the center O and which has an edge portion at a distance of 1.2 R or more from the center O, the shape is not limited to this and may be a circle or an ellipse which surrounds the center O and which has an edge portion at a distance of 1.2 R or more from the center O.

Incidentally, the center of gravity may instead be used for a shape the center of which cannot be defined.

In the light guiding member 2002 according to the present embodiment, the unnecessary light transmitting surfaces 2002t having the same shape are provided on both sides of the opposing edge portions in the first direction of the folding reflection surface 2002r (both sides of the first cross-section of the fold reflection surface 2002r). However, the configuration is not limited to this, and it is possible to obtain the effects of the present embodiment if only one unnecessary light transmitting surface 2002t is provided on either side or the shapes are different from each other.

Moreover, in the light guiding member 2002 according to the present embodiment, the folding reflection surface 2002r also serves as a stop for limiting the diameter of the light flux (limiting the light flux) in the primary optical path. This eliminates the necessity of providing a separate stop and is advantageous in enhancing the degree of freedom of the configuration and in reducing the costs. Furthermore, it is possible to set with high accuracy the relative positions between the folding reflection surface 2002r serving as a stop and another optical plane such as the anamorphic surface 2002d of the light guiding member 2002. Therefore, it is possible to obtain effects advantageous in manufacture.

In the light guiding member 2002 according to the present embodiment, the angle (acute angle and absolute value) formed between the folding reflection surface 2002r and the unnecessary light transmitting surfaces 2002t is 45 degrees, which is 20 degrees or more. This makes it possible to place the light beams of the secondary optical paths at positions far distant from the primary optical path and to obtain an effect of diverting the light beams of the secondary optical paths from the slit 2001a. Note that 45 degrees mentioned here includes not only the case of strictly 45 degrees but also the case of an error of a few degrees due to manufacturing errors and the like.

In the light guiding member 2002 according to the present embodiment, both the folding reflection surface 2002r and the unnecessary light transmitting surfaces 2002t are formed of a flat surface. This simplifies the structure of the light guiding member 2002. However, the configuration is not limited to this, and it is possible to obtain the effects of the present embodiment if at least one of the folding reflection surface 2002r and the unnecessary light transmitting surfaces 2002t is formed of a curve surface.

Additionally, the light guiding member 2002 according to the present embodiment is configured such that the light beam of the primary optical path is totally reflected by the folding reflection surface 2002r. This eliminates the necessity of providing a reflection film to the folding reflection surface 2002r and makes it possible to reduce the costs. However, the configuration is not limited to this, and it is possible to obtain the effects of the present embodiment if the folding reflection surface 2002r is provided with a reflection film.

Note that the light guiding member 2002 according to the present embodiment is configured such that the light beam of the primary optical path is totally reflected by the folding reflection surface 2002r because the normal of the anamorphic surface 2002d on the optical axis and the normal of the folding reflection surface 2002r make an angle of 45 degree.

Moreover, in the light guiding member 2002 according to the present embodiment, the slit 2001a is disposed along the primary optical path on the reflected light side of the folding reflection surface 2002r. This makes it possible to block most of the scattered light with the slit 2001a even when the light beams of the secondary optical paths are scattered by the side surface 2002s. Thus, it is possible to suppress the deteriorating of the optical performance attributed to scattering. As a result, a high light-blocking property can be achieved.

Furthermore, the light guiding member 2002 according to the present embodiment is made of a resin material. This makes it possible to achieve cost reduction and enhance the degree of freedom of the shape compared to the case of forming the light guiding member with glass. However, the present embodiment is not limited to this, and it is also possible to obtain the effects of the present embodiment in the case of forming the light guiding member with glass.

When the light guiding member 2002 according to the present embodiment is used for an optical detector which includes a light guiding member and a light receiving element to receive light guided by the light guiding member, it is possible to obtain an optical detector with a simple structure which is capable of suppressing the risk that the unnecessary light could be mixed in the primary optical path along which the desired light travels. Additionally, it is possible to provide a light-blocking element in such optical detector.

Second Embodiment

Figure 5A:
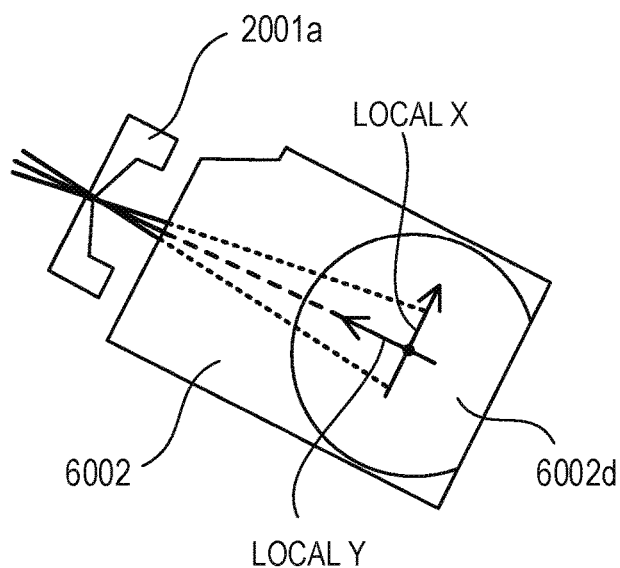
FIG. 5A is a cross-sectional view of a main part of the spectral colorimetric apparatus including a light guiding member according to a second embodiment.
Figure 5B:
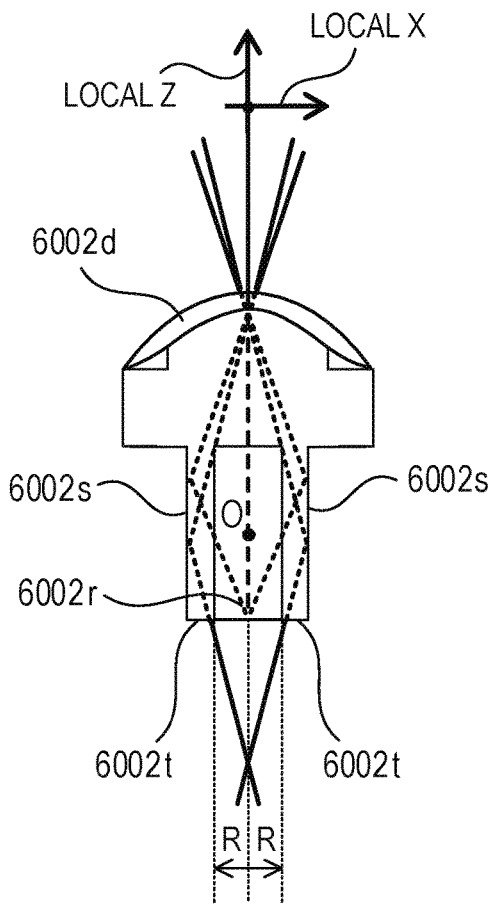
FIG. 5B is a cross-sectional view of a main part of the spectral colorimetric apparatus including the light guiding member according to the second embodiment.
Figure 5C:
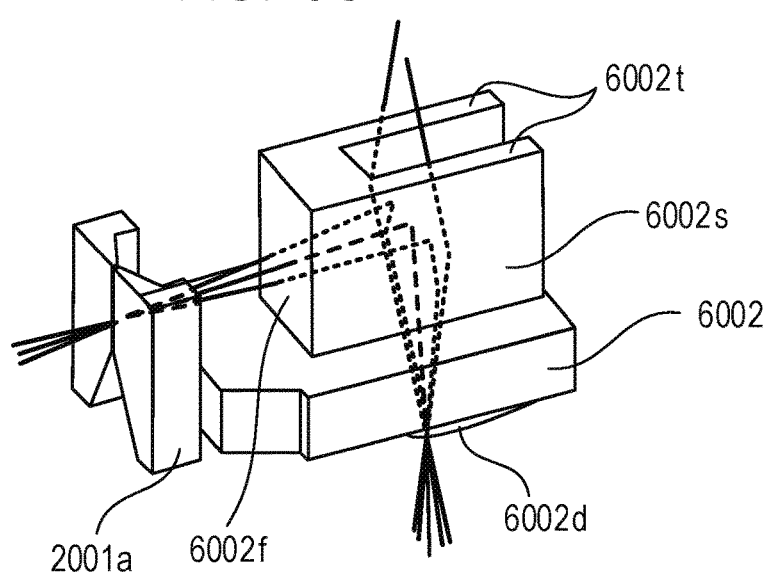
FIG. 5C is a perspective view of a main part of the spectral colorimetric apparatus including the light guiding member according to the second embodiment.

FIGS. 5A, 5B, and 5C each illustrate a local XY cross-sectional view, a local XZ cross-sectional view viewed in the +local Y direction, and a perspective view of a main part 6002m of the spectral colorimetric apparatus 6000 provided with a light guiding member 6002 according to a second embodiment.

Note here that FIG. 5B does not illustrate the slit 2001a and that FIG. 5C and FIG. 5B have an inverted relationship.

Note that the local X direction, the local Y direction, and the local Z direction are parallel to the first direction (direction perpendicular to the first cross-section which is parallel to the optical path of the incident light entering the folding reflection surface 6002r on the optical axis and to the optical path of the reflected light reflected by the folding reflection surface 6002r), the direction parallel to the second optical path, and the direction parallel to the first optical path, respectively. Moreover, the center of the detected object is positioned at the origin of the local XYZ coordinate system.

Furthermore, the slit 2001a is disposed such that the transverse direction and the longitudinal direction of the slit hole of the slit 2001a are parallel to the first direction and the first optical path, respectively.

The spectral colorimetric apparatus 6000 has the same configuration as that of the spectral colorimetric apparatus 2000 of the first embodiment except for different dimensions of the light guiding member. For this reason, the same members are labeled with the same reference numerals for omission of explanation.

Specifically, the light guiding member 6002 has the same configuration as that of the light guiding member 2002 according to the first embodiment except for different widths of the unnecessary light transmitting surfaces 6002t and different positions of the side surfaces 6002s. For this reason, each of the same optical planes has "6" in its thousand's place instead of "2."

Table 3 below show the optical design values of the spectral colorimetric apparatus 6000.

TABLE 3

|  |  | Symbol | Value |
| --- | --- | --- | --- |
| Main Wavelength of Light Source 2005 |  | λ | 550 nm |
| Refractive Index of Light guiding member 6002 |  | n(λ) | 1.49361 |
| Anamorphic Surface 6002d | Aspheric | R | −4.25 |
|  | Coefficients | K | −0.67186 |
|  |  | C02 | −0.23746 |
|  |  | C22 | 0.009414 |
|  |  | C04 | 0.017413 |
|  | Opening | φ | 4.5 |
| Slit 2001a | Width | hs | 0.06 |
|  | Length | ls | 1.8 |
| Folding Reflection Surface 6002r | Width | hr | 1.2 |
|  | Length | lr | 4.8 |
| Unnecessary Light Transmitting Surface 6002t | Width (−X Side) | ht− | 0.5 |
|  | Width (+X side) | ht+ | 0.5 |

|  | Local Coordinate | | | Tilt (Direction of Surface Normal) | | |
| --- | --- | --- | --- | --- | --- | --- |
|  | X | Y | Z | Tilt X | Tilt Y | Tilt Z |
| Center Position of Detection | 0 | 0 | 0 | 0 | 0 | 90 |
| Anamorphic Surface 6002d | 0 | 0 | −4.3 | 0 | 0 | −90 |
| Folding Reflection Surface 6002r | 0 | 0 | −8.6 | −135 | 0 | 90 |
| Received Light Exit Surface 6002f | 0 | 3.2 | −8.6 | −90 | 0 | −90 |
| Slit 2001a | 0 | 6.7 | −8.6 | −90 | 0 | −90 |
| Unnecessary Light Transmitting Surface 6002t (−X Side) | −0.85 | 0 | −10.4 | 0 | 0 | 90 |
| Unnecessary Light Transmitting Surface 6002t (+X Side) | 0.85 | 0 | −10.4 | 0 | 0 | 90 |

Note that the coordinates of the slit 2001a and the optical planes of the light guiding member 6002 are defined by the local XYZ coordinate system, and the aspherical shape of the anamorphic surface 6002d is represented by the expression (1).

Moreover, Tilt X is an operation of rotating from the local Y direction to the local Z direction in the right-handed system with the local X axis as the center of rotation, and Tilt Y is an operation of rotating from the local Z direction to the local X direction in the right-handed system with the local Y axis as the center of rotation.

Furthermore, Tilt Z is an operation of rotating from the local X direction to the local Y direction in the right-handed system with the local Z axis as the center of rotation.

Note that in the case of (Tilt X, Tilt Y, Tilt Z)=(0, 0, 0), assume that the surface normal is oriented in the local Z direction and the above operations are carried out in the order of Tilt X, Tilt Y, and Tilt Z.

In the spectral colorimetric apparatus 6000, as illustrated in FIGS. 5A to 5C, the light beam travelling along the primary optical path (dashed line) is folded by the folding reflection surface 6002r, passes through the slit 2001a, then is dispersed by the diffraction surface 2003*d* of the diffraction element 2003, and condensed as desired light on the light-receiving element 2006.

On the other hand, the light beams travelling along the secondary optical paths (dotted lines) are reflected at the side surfaces 6002*s* and then are divided into light beams toward the folding reflection surface 6002*r* and light beams toward the unnecessary light transmitting surfaces 6002*t*. As a result, the light beams toward the folding reflection surface 6002*r*, among the light beams of the secondary optical paths, pass through the slit 2001*a* and then are condensed as unnecessary light on the light-receiving element 2006. Thus, the optical performance deteriorates to some extent.

As described above, the spectral colorimetric apparatus 6000 has an insufficient space between each side surface 6002*s* and an edge portion of the folding reflection surface 6002*r*. For this reason, it is impossible to divert all the light beams of the secondary optical paths, reflected by the side surfaces 6002*s*, from the folding reflection surface 6002*r*.

However, since it is possible to divert some of the light beams of the secondary optical paths from the folding reflection surface 6002*r*, the spectral colorimetric apparatus 6000 according to the present embodiment is capable of suppressing the deteriorating of the optical performance compared to the spectral colorimetric apparatus 4000 of the comparative example.

A simulation was carried out using the optical design values shown in Table 3 as in the case of the spectral colorimetric apparatus 2000 according to the first embodiment to obtain as a result the secondary optical path light amount ratio I'/I for the spectral colorimetric apparatus 6000 according to the present embodiment as below.

The secondary optical path light amount ratio I'/I for the spectral colorimetric apparatus 4000 of the comparative example=37%

The secondary optical path light amount ratio I'/I for the spectral colorimetric apparatus 6000 according to the present embodiment=17%

From above, the spectral colorimetric apparatus 6000 including the light guiding member 6002 according to the present embodiment is also capable of suppressing the risk that unnecessary light, a cause of deteriorating the optical performance, could be mixed in the primary optical path along which the desired light travels, while forming the light guiding member 6002 in a simple structure.

This makes it unnecessary to take measures against unnecessary light in the spectral colorimetric apparatus 6000, especially in the spectroscopic optical system 6011 and to enhance the degree of freedom of the configuration.

While the spectral colorimetric apparatus 6000 according to the present embodiment is inferior to the spectral colorimetric apparatus 2000 according to the first embodiment in the effect of suppressing the risk that unnecessary light could be mixed, the spectral colorimetric apparatus 6000 according to the present embodiment can reduce the size of the light guiding member 6002 and at the same time enhance the degree of freedom of the arrangement of members other than the light guiding member 6002.

As described above, the configuration may be set as appropriate depending on the optical performance required, and it is unnecessary to reduce the secondary optical path light amount ratio I'/I to 0% as in the case of the spectral colorimetric apparatus 2000 according to the first embodiment.

[Image Forming Apparatus]

Figure 6:
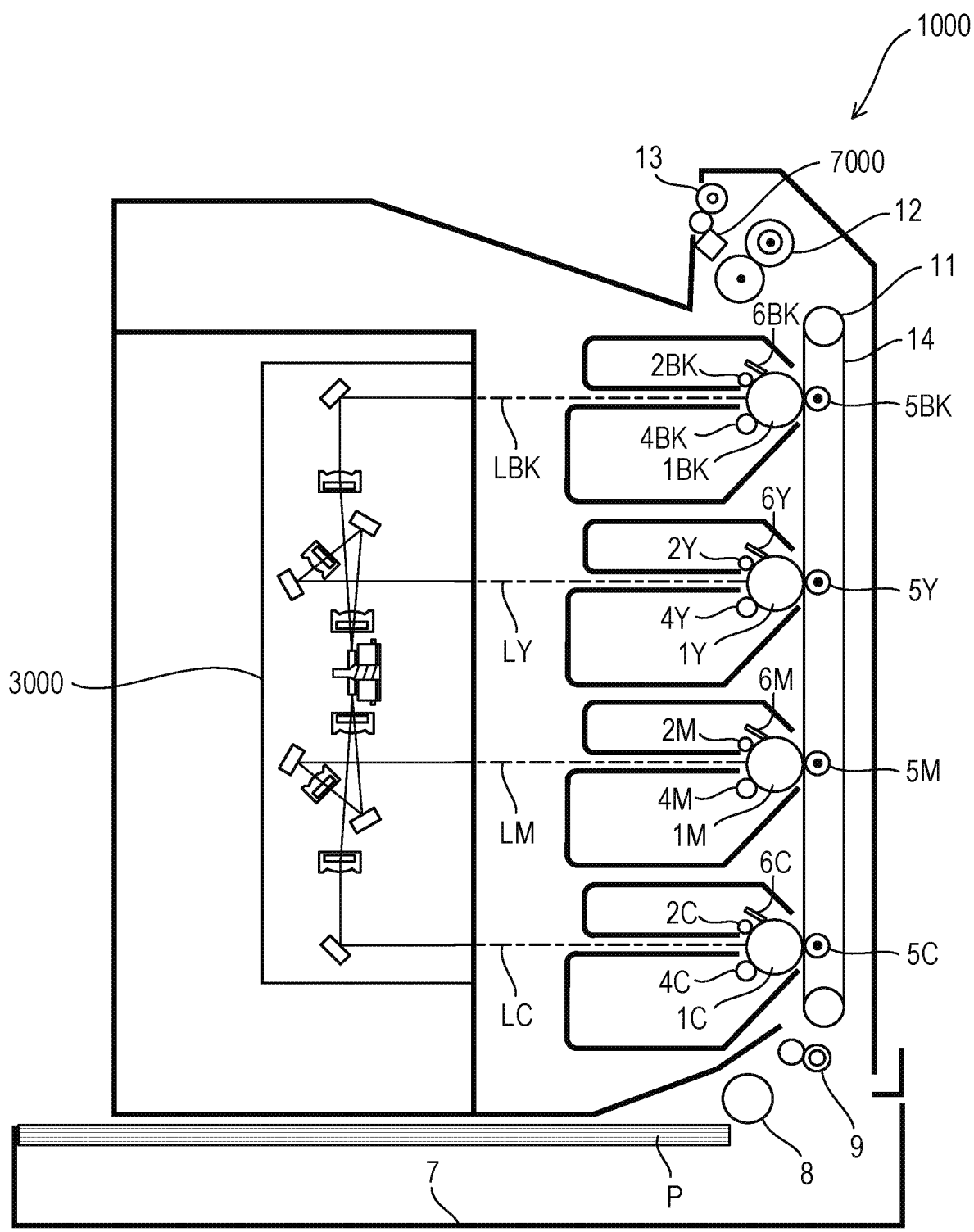
FIG. 6 is a side cross-sectional view of a color image forming apparatus provided with the spectral colorimetric apparatus including the light guiding member according to the first or the second embodiment.

FIG. 6 illustrates a side cross-sectional view of a color image forming apparatus 1000 provided with a spectral colorimetric apparatus 7000 including the light guiding member according to the first or the second embodiment.

The color image forming apparatus 1000 includes photosensitive drums (photosensitive bodys) 1C, 1M, 1Y, and 1BK as image carriers disposed at equal intervals and primary chargers 2C, 2M, 2Y, and 2BK.

In addition, the color image forming apparatus 1000 includes developing units 4C, 4M, 4Y, and 4BK, transferring rollers 5C, 5M, 5Y, and 5BK, and cleaners 6C, 6M, 6Y, and 6BK.

Moreover, the color image forming apparatus 1000 includes a fixing unit 12, a transferring belt 14, an optical scanning device 3000, and the spectral colorimetric apparatus 7000.

Light beams (laser beams) LC, LM, LY, and LBK, each of which is optically modulated based on the image information, are emitted from the optical scanning device 3000. Each of the emitted light beams LC, LM, LY, and LBK forms an electrostatic latent image by scanning on the photosensitive surface of the corresponding photosensitive drum 1C, 1M, 1Y, or 1BK disposed at the position of the scanned surface and uniformly charged by the primary charger 2C, 2M, 2Y, or 2BK.

The electrostatic latent images thus formed are visualized by the developing units 4C, 4M, 4Y, and 4BK as images of cyan, magenta, yellow, and black, respectively (developed as toner images). The visualized images are electrostatically transferred on a sheet P (transferred material) conveyed on the transferring belt 14 by the transferring rollers 5C, 5M, 5Y, and 5BK (transferring units) in a sequential manner. In this way, a color image is formed on the sheet P.

After that, the residual toner remaining on the surfaces of the photosensitive drums 1C, 1M, 1Y, and 1BK is removed by the cleaners 6C, 6M, 6Y, and 6BK. Then, the photosensitive drums 1C, 1M, 1Y, and 1BK are uniformly charged again by the primary chargers 2C, 2M, 2Y, and 2BK in order to form the next color image.

The sheets P are stacked on the paper feed tray 7, fed by a paper feed roller 8 one by one, and sent out by a registration roller 9 onto the transferring belt 14 in synchronization with the timing of drawing the image.

While the sheet P is being accurately conveyed on the transferring belt 14, a cyan image, a magenta image, a yellow image, and a black image formed on the photosensitive surfaces of the photosensitive drums 1C, 1M, 1Y, and 1BK are sequentially transferred onto the sheet P to form a color image.

A driving roller 11 accurately feeds the transferring belt 14 and is connected to a not-illustrated driving motor having small rotational irregularity. The color image formed on the sheet P is fixed with a pressure and a heat by the fixing unit 12, then conveyed by a paper discharging roller 13 and the like, and discharged to the outside of the apparatus.

The spectral colorimetric apparatus 7000 is provided on the sheet conveyance path immediately behind the fixing unit 12 such that illumination light is irradiated onto the image surface which has fixed color patches formed on the sheet surface of the sheet P.

Regarding the sheet P having color patches formed thereon after passing the fixing unit, the spectral colorimetric apparatus 7000 detects the chromaticity for each color patch on the conveyed sheet. Here, colorimetry is carried out on the color patches on the sheet surface after the image is fixed for the purpose of color matching in consideration of the change in chromaticity attributed to, for example, sheet type and fixing.

Next, the detection results read by the spectral colorimetric apparatus 7000 are transmitted to a non-illustrated printer controller. Here, the printer controller makes a determination as to whether or not the colors of the outputted color patches are properly reproduced. If the color difference of the color patch of a single color or a mixed color outputted is within a predetermined range in the chromaticity instructed by the printer controller, the color calibration is terminated. If the color difference is out of the predetermined range, the printer controller is also capable of color calibration until the color difference falls within a predetermined color difference range based on the color difference information.

If the color image forming apparatus 1000 has the spectral colorimetric apparatus 7000 mounted thereon as described above, it is possible to correct the chromaticity to the absolute chromaticity under all conditions even when a chromaticity difference of the color image formed on the sheet surface occurs due to machine difference of the image forming apparatus 1000, sheet type, use environment, frequency of use, etc. For this reason, reliable and stable chromaticity makes it possible to achieve a higher level of color calibration.

The present invention makes it possible to provide a light guiding member with a simple structure which is capable of suppressing the risk that unnecessary light could be mixed in the primary optical path.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2017-227617, filed Nov. 28, 2017, which is hereby incorporated by reference herein in its entirety.

What is claimed is:

1. A light guiding member comprising:
    an incident surface;
    a reflection surface which reflects a light flux from the incident surface; and
    a side surface,
    wherein the side surface is disposed at a distance of 1.2 R or more from a center of the reflection surface, where R is a distance from the center to an edge portion of the reflection surface, in a direction perpendicular to a first cross-section including an incident light toward the reflection surface on an optical axis and a reflected light from the reflection surface on the optical axis.

2. The light guiding member according to claim 1, further comprising:
    convex portions on both sides of the reflection surface, the first cross-section being sandwiched between the convex portions.

3. The light guiding member according to claim 1, wherein the incident surface, the reflection surface, and the side surface are integrally formed.

4. The light guiding member according to claim 1, wherein the reflection surface and the side surface are perpendicular to each other.

5. The light guiding member according to claim 1, wherein the incident surface and the side surface are perpendicular to each other.

6. The light guiding member according to claim 1, wherein an angle formed between the incident surface and the reflection surface is 45 degrees.

7. The light guiding member according to claim 1, wherein there is no optical plane between the side surface and the edge portion of the reflection surface in a second cross-section which includes the reflection surface and which is parallel to the reflection surface.

8. The light guiding member according to claim 1, further comprising:
    an unnecessary light exit surface which allows an unnecessary light flux, entering from the incident surface and travelling between the side surface and the reflection surface, to exit therefrom.

9. The light guiding member according to claim 8, wherein an angle formed between the reflection surface and the unnecessary light exit surface is 20 degrees or more.

10. The light guiding member according to claim 8, wherein the unnecessary light exit surface is a flat surface.

11. The light guiding member according to claim 8, wherein the unnecessary light exit surface is provided on both sides of the reflection surface, the first cross-section being sandwiched between the unnecessary light exit surfaces.

12. The light guiding member according to claim 1, wherein the reflection surface limits the light flux from the incident surface.

13. The light guiding member according to claim 1, wherein the reflection surface is a flat surface.

14. The light guiding member according to claim 1, wherein a part of the light flux from the incident surface is totally reflected by the reflection surface.

15. A detector comprising:
    the light guiding member according to claim 1; and
    a light receiving element to receive light from the light guiding member.

16. The detector according to claim 15, further comprising:
    a light blocking element which blocks part of the light flux from the light guiding member.

17. A spectral colorimetric apparatus comprising:
    the light guiding member according to claim 1;
    a spectroscopic element which disperses a light flux from the light guiding member; and
    a light receiving element which receives the light flux from the spectroscopic element.

18. The spectral colorimetric apparatus according to claim 17, wherein a dispersing direction of the spectroscopic element is perpendicular to the first cross-section.

19. The spectral colorimetric apparatus according to claim 17, further comprising:
    a light blocking element which blocks part of the light flux from the light guiding member.

20. An image forming apparatus comprising:
    an optical scanning device which scans a scanned surface;
    a developing unit which develops an electrostatic latent image, formed on the scanned surface, as a toner image;
    a transferring unit which transfers the developed toner image onto a transferred material;
    a fixing unit which fixes the transferred toner image on the transferred material; and
    the spectral colorimetric apparatus according to claim 17 which performs colorimetry of the toner image.

\* \* \* \* \*